(12) United States Patent
Flottmann et al.

(10) Patent No.: US 6,375,011 B1
(45) Date of Patent: Apr. 23, 2002

(54) VIBRATING CONVEYOR AND METHOD FOR CONVEYING SILICON FRAGMENTS

(75) Inventors: Dirk Flottmann, Singapore (SG); Franz Köppl, Erlbach (DE); Matthäus Schantz, Reut (DE); Friedrich Steudten, Burghausen (DE)

(73) Assignee: Wacker-Chemie GmbH, Munich (DE)

( * ) Notice: Subject to any disclaimer, the term of this patent is extended or adjusted under 35 U.S.C. 154(b) by 0 days.

(21) Appl. No.: 09/537,208

(22) Filed: Mar. 29, 2000

(30) Foreign Application Priority Data

Apr. 1, 1999 (DE) .......................... 199 14 998

(51) Int. Cl.⁷ ............................... B07B 1/28
(52) U.S. Cl. .................. 209/261; 209/309; 209/325; 209/643; 198/750.1
(58) Field of Search ............... 209/3, 254, 261, 209/309, 313, 320, 321, 325, 44, 643; 198/750.1

(56) References Cited

U.S. PATENT DOCUMENTS

| | | | |
|---|---|---|---|
| 693,019 A | * 2/1902 | Holmes | 209/313 X |
| 5,122,262 A | * 6/1992 | Summers | 209/321 |
| 5,700,497 A | * 12/1997 | Stone et al. | 209/254 X |
| 6,040,544 A | * 3/2000 | Schantz et al. | 209/576 X |
| 6,073,773 A | * 6/2000 | Wolf et al. | 209/3 X |

FOREIGN PATENT DOCUMENTS

| | | |
|---|---|---|
| DE | 2226968 | 12/1973 |
| DE | 2422821 | 11/1974 |
| DE | 216 911 | 1/1985 |
| DE | 4307138 | 9/1994 |
| ZA | 7403035 | 5/1974 |

OTHER PUBLICATIONS

English Derwent Abstract AN 1985–105364[18] corresp.to DD216911.
English Derwent Abstract AN 1994–280727 [35] corresp. to DE 4307 138.
English Derwent Abstract AN 1974–84824V[49] corresp. to DE 2422821.

* cited by examiner

Primary Examiner—Tuan N. Nguyen
(74) Attorney, Agent, or Firm—Collard & Roe, P.C.

(57) ABSTRACT

A method for conveying silicon fragments has the silicon fragments being conveyed over a conveyor surface, which is made from hyperpure silicon. There is a vibrating conveyor, and during the conveying, the sharp edges of the silicon fragments are rounded and mechanical-physical decontamination takes place. The vibrating conveyor has a conveyor surface which is made from hyperpure silicon. A second vibrating conveyor unit has a conveyor surface which is made from hyperpure silicon and has passage openings therethrough.

3 Claims, 2 Drawing Sheets

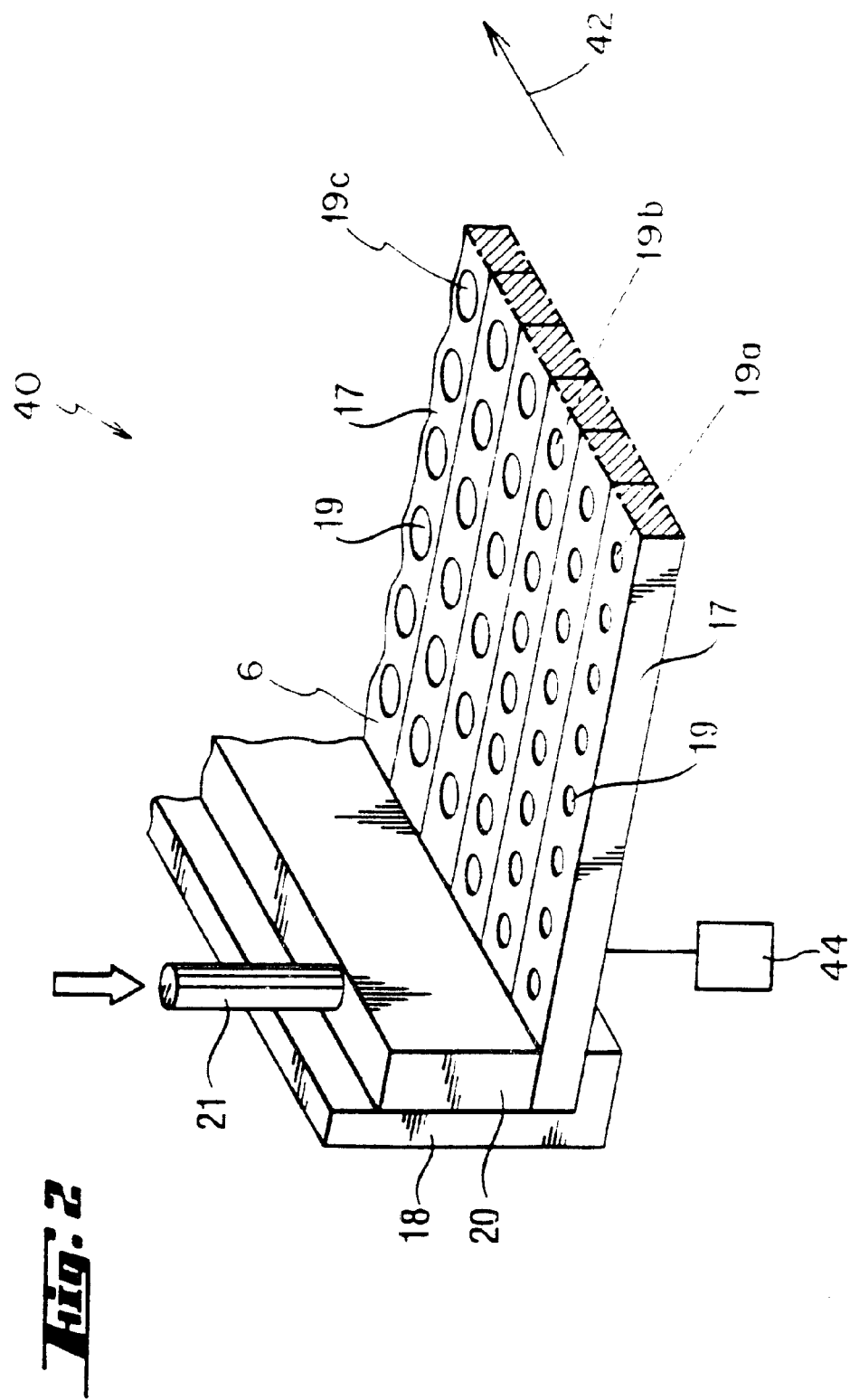

VIBRATING CONVEYOR AND METHOD FOR CONVEYING SILICON FRAGMENTS

BACKGROUND OF THE INVENTION

1. Field of the Invention

The present invention relates to a method for conveying silicon fragments. The present invention also relates to a vibrating conveyor.

2. The Prior Art

High-purity silicon is produced, for example, by chemical vapor phase deposition of a high-purity chlorosilane gas on a heated substrate. The silicon is deposited in the form of polycrystalline rods. A large proportion of the monocrystalline silicon which is required for the semiconductor industry is produced from these silicon rods using the Czochralski crucible-pulling process.

In this process, a melting crucible is filled with broken pieces of silicon, referred to below as silicon fragments, with typical diameters of between 5 and 150 mm. The silicon fragments are melted, and a mono-crystalline silicon bar is pulled out of the molten material by means of a monocrystalline seed. The silicon fragments which are needed to fill the melting crucible are obtained by breaking up the polycrystalline bars produced during the vapor phase deposition. The breaking tools used are, for example, hammers, chisels or jaw or rolling crushers made from metal.

After the hard, brittle silicon rods have been broken up, it is possible to detect contaminating particles and foreign atoms on the sharp-edged surfaces of the fragments. The particles are generally dust which is produced during crushing of the silicon and during conveying of the fragments. The foreign atoms result in particular from the crushing tools.

This contamination must be removed before the silicon fragments are melted in the melting crucible. This is preferably carried out by means of a material removing etching treatment using acids or acid mixtures, followed by rinsing with water.

The large specific surfaces of the sharp edged fragments have serious drawbacks, resulting in particular in

- a high consumption of acid for material-removing treatments,
- a high level of acid entrainment due to the film of acid adhering to the surface when the silicon fragments are transferred to a rinsing bath, with associated contamination of the rinsing water, and
- etch-back of the broken edges.

SUMMARY OF THE INVENTION

It is therefore, an object of the present invention to provide a method and a device which reduce the abovementioned drawbacks of sharp edged silicon fragments.

The above object is achieved according to the invention by means of a method for conveying silicon fragments wherein the silicon fragments are guided over a conveyor surface, which is made from hyperpure silicon, of a vibrating conveyor.

The above object is also achieved according to the invention by means of a vibrating conveyor, wherein the conveyor surface is made from hyperpure silicon.

Surprisingly, it has been found that the sharp edged silicon fragments become rounded when they are conveyed on the vibrating conveyor surface of a vibrating conveyor. The fact that the specific surfaces of the silicon fragments are reduced and contamination adhering to the surface is ground off has proven particularly advantageous in the present invention. According to the invention, the silicon fragments are conveyed on a conveyor surface which is made from hyperpure silicon and is preferably of planar, trough-like or tubular construction. In the context of the present invention, hyperpure silicon is understood to mean monocrystalline or polycrystalline silicon with a purity of preferably >99.99%. Ideally, the conveyor surface made from silicon possesses the same level of purity as the silicon fragments which are to be conveyed.

The conveyor surface is moved by means of rapid vibrations of preferably low amplitude, in particular forward-upward and backward-downward. The silicon fragments resting on the conveyor surface are thus subjected to a progressive forward movement which ranges from an abrasive movement to a throwing movement. During this movement, all sides of a silicon fragment face successively toward the hyperpure silicon surface. As a result of the grinding and throwing movement of the silicon fragments on the hyperpure silicon surface, the edges are broken and contamination adhering to the surface is ground off. As a result, uniform rounding of the fragments can be observed. The dust formed is advantageously separated from the flow of silicon fragments, for example by means of an extraction unit. This unit is preferably located along the conveying path, particularly preferably located at the discharge end. In addition, magnetic particles are separated from the flow of silicon fragments by means of an electromagnet or permanent magnet which is arranged, for example, at the discharge end.

In a preferred embodiment of the present invention, the silicon fragments which have been rounded by means of the first vibrating conveyor unit are guided over a second vibrating conveyor unit. The conveyor surface of the second vibrating conveyor unit preferably has passage openings, such as for example gaps or holes. In the process, the silicon fragments are conveyed on the conveyor surface, which may preferably be of planar, trough-like or tubular shape and is made from hyperpure silicon. By means of this second vibrating conveyor unit, the rounded silicon fragments are rounded further. The rounding results in the silicon fragments losing about 0.5% by weight and in a reduction in the metal contamination level from 600 ppb to 100 ppb. The silicon fragments are classified and separated and dust is removed by means of these passage openings.

BRIEF DESCRIPTION OF THE DRAWINGS

Other objects and features of the present invention will become apparent from the following detailed description considered in connection with the accompanying drawings which disclose several embodiments of the present invention. It should be understood, however, that the drawings are designed for the purpose of illustration only and not as a definition of the limits of the invention.

In the drawings wherein similar reference characters denote similar elements throughout the several views, FIG. 2 shows a conveyor surface with side attachment fittings, conveying edges made from hyperpure silicon and pressure-exerting means.

DETAILED DESCRIPTION OF PREFERRED ENVIRONMENTS

Figure 1:
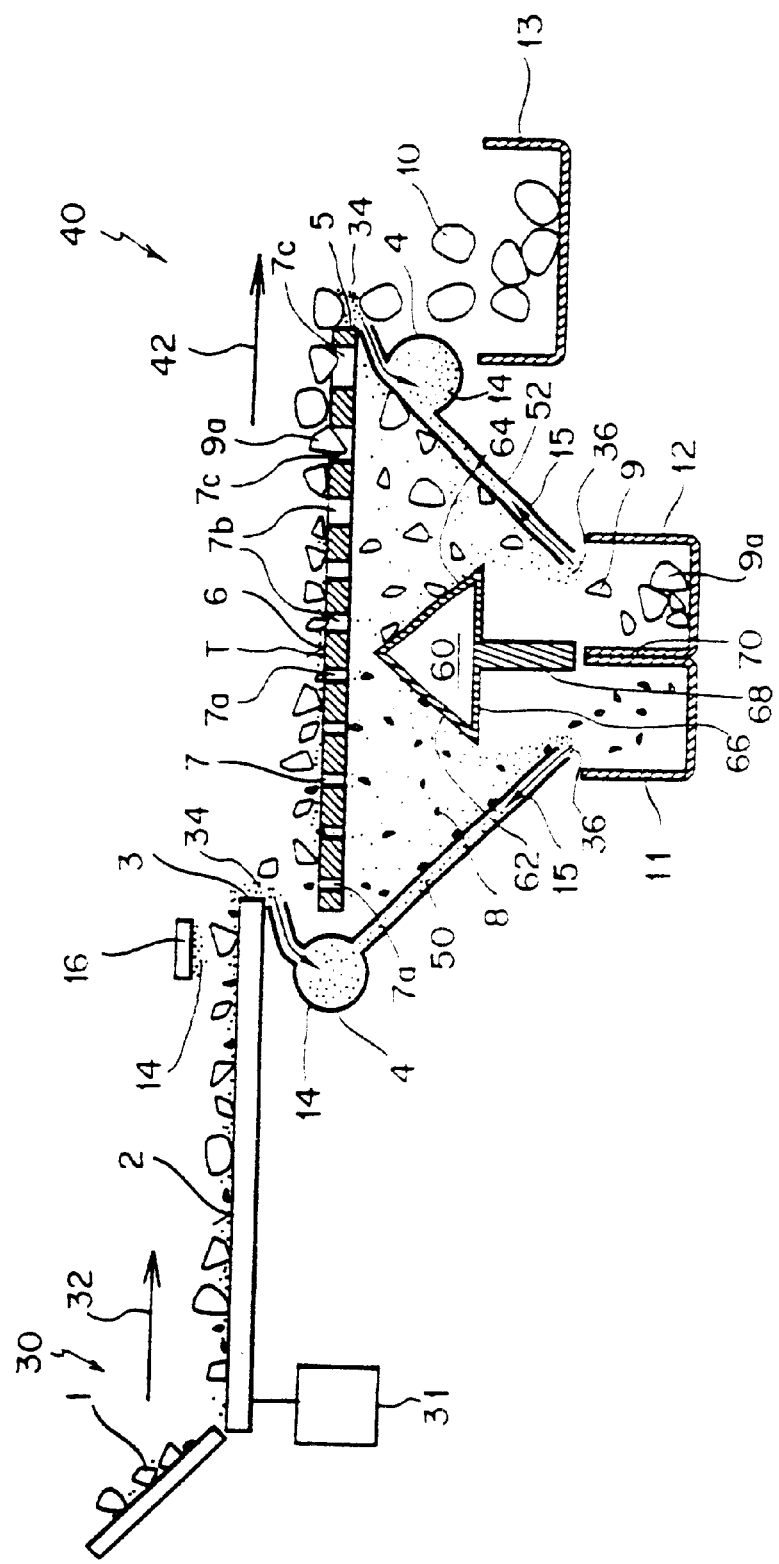
FIG. 1 shows a diagrammatic side view of a device according to the invention.

Turning now in detail to the drawings, FIG. 1 shows carrying out the method according to the invention. Silicon fragments 1, with typical diameters of between 5 and 150 mm, as prepared, for example, in a crushing unit, are moved onto the conveyor surface 2 of a first vibrating conveyor unit 30 according to the invention. Vibrations are caused by vibration means 31. The silicon fragments are conveyed in the conveying direction 32 toward the discharge end 3 by rapid vibrations of the conveyor surface, preferably of low amplitude. As a result of the throwing and grinding movement of the silicon fragments 1 on the conveyor surface 2, which is made from hyperpure silicon, the edges are broken and contamination adhering to the surface is ground off. This abraded material 14 is separated from the rounded silicon fragments, particularly preferably at the discharge end 3. This separation is by means of an extraction unit 4 and by means of an electromagnet or permanent magnet 16. Extraction unit 4 is preferably a vacuum means, having inlet openings 34 and 36.

In a preferred embodiment, the rounded silicon fragments are guided over a second vibrating conveyor unit 40. Vibrations are caused by vibration means 44 as shown in FIG. 2. The rounded silicon fragments are conveyed toward the discharge end 5 by means of rapid vibrations of the conveyor surface of preferably low amplitude. The conveyor surface 6, which is made from hyperpure silicon, has passage openings 7, which preferably increase in width or diameter in the direction of the discharge end 5. Passing the rounded silicon fragments over the conveyor surface with passage openings allows further rounding, separation and dust removal from the silicon fragments. Classification or separation is, as illustrated by way of example in FIG. 1, divided into three grades; depending on the size of the passage openings 7. Firstly, for example, are silicon fragments 8 with a diameter of up to 25 mm; then secondly are fragments 9 with diameters of from 25 to 100 mm. Finally thirdly, at the discharge end of the second vibrating conveyor unit, are substantially rounded silicon fragments 10 with diameters of >100 mm which are collected in suitable receptacles 11, 12, and 13. The edges of the silicon fragments are broken up further and contamination adhering to the surface is ground off further. This is due to the throwing and grinding movement of the silicon fragments on the conveyor surface 6 with passage openings 7. This abraded material 14 is preferably separated from the rounded silicon fragments at the discharge end 5. Following the separation and removal of material 14, it is conveyed in direction 15, for example by means of an extraction device 4.

As shown in FIG. 2, the conveyor surface 6 of the second vibrating conveyor unit 40 preferably comprises hyperpure silicon plates 17 which are arranged parallel to one another and are fixed by means of side attachment fittings 18. The hyperpure silicon plates 17 have passage openings 19, for example in the form of apertures. The conveying edges 20 are likewise made from hyperpure silicon plates and are fixed, for example, by holding-down means 21. The conveying edges 20 are used to laterally delimit the conveyor surfaces.

The silicon plates are preferably between 5 and 10 cm wide, preferably between 1 and 5 cm high and preferably between 60 and 100 cm long. The passage openings in the conveyor surface 6 of the second vibrating conveyor unit 40 are preferably gaps between the parallel silicon plates or cylindrical or conical apertures in the conveyor surface, which are preferably round or polygonal. For classification and separation as shown in FIG.1 and in FIG. 2, the width of the gaps or the diameter of the apertures increases along the conveying path 42. Advantageously, the conveyor surfaces, which are made from hyperpure silicon plates, are supported by steel plates and, if appropriate, shock-absorbing mats.

A precondition for contamination-free rounding, classification and dust removal of the silicon fragments using the method described above is to provide silicon surfaces. Preferably there are hyperpure silicon surfaces, on all the parts which come into contact with the silicon fragments. In particular, these include the conveyor surfaces and the lateral conveying edges.

As is shown in FIG. 1, the passage openings 7 are gaps between the parallel silicon plates 17. The width of the gaps increases along the conveying path 42 for the second vibrating conveyor unit 40. Therefore, the width of gap 7c is greater than the width of gap 7b, which in turn is greater than the width of gap 7a.

As is shown in FIG. 2, the passage openings 19 in the conveyor surface 6 are cylindrical or conical apertures 19a, 19b and 19c. The diameter of these apertures increases along the conveying path 42. Thus the diameter of aperture 19c is greater than the diameter of aperture 19b, which in turn is greater than the diameter of aperture 19a.

The method for separating and for classifying silicon fragments will now be further described by reference to FIG. 1. The second vibrating conveyor unit 40 is constructed as an inverted triangle shaped structure with a left side 50, a right side 52 and the third side 6 being the conveyor surface. The silicon fragments are conveyed across the first vibrating conveyor unit 30 in the conveying direction 32 along the conveyor surface 2 until these fragments 1 reach discharge end 3. The abraded material 14 which is the very smallest in size passes over end 3 and falls by gravity and is suctioned into the vacuum extraction unit 4 at inlet opening 34. The larger sized silicon fragments 8, 9a, 9 and 10 are either prevented from entering inlet opening 34, for example by use of a screen, or are too large in size to enter the inlet opening 34.

The larger sized fragments 8, 9, 9a and 10 fall by gravity onto the conveyor surface 6 of the second vibrating conveyor unit 40. Surface 6 is at a lower level below the conveyor surface 2; and conveyor surface 6 has passage openings 7 of preferably three different sizes 7a, 7b, and 7c. Passage openings 7a are the smallest in size and are adjacent to discharge end 3 of the first vibrating conveyor unit 30. Passage openings 7c are the largest in size and are adjacent to the discharge end 5 of the second vibrating conveyor unit 40. Passage openings 7b are of intermediate or medium size and are positioned between the smaller openings 7a and the largest openings 7c. These openings increase in diameter along the conveying path 42 of the second vibrating conveyor unit 40. As these fragments move along the conveying path 42, the smaller fragments fall through the smaller openings 7a; the intermediate size fragments 9 fall through the intermediate size opening 7b; and the larger size fragments 9a fall through the larger size openings 7c. The largest fragments 10 do not fall through any of the openings 7a, 7b or 7c and at discharge end 5 fall into receptacle 13.

There is a transition point T at which the openings change from the smaller size 7a to the intermediate size 7b. To the left of this transition point T, on surface 6, small size fragments 8 are separated from the intermediate and largest fragments 9, 9a, and 10. To the right of this transition point T, on surface 6, the intermediate size fragments 9 and 9a are separated from the largest fragments 10.

Beneath transition point T is a deflector 60 which is constructed as an equilateral triangle or an isosceles triangle with left side 62 equal in length to right side 64. The base 66 of the triangle rests upon support beam 68 which holds the triangle in an elevated location above the common wall 70 of the adjoining receptacles 11 and 12 and below the surface 6 at the transition point. The location of the triangle 60 is such that smaller fragments 8 which fall through smaller openings 7a will contact left wall 50 and/or left side 62 and be deflected into receptacle 11. Also the location of the triangle is such that the medium size fragments 9 and 9a will pass through intermediate size openings 7b and 7c and will contact right wall 52 and/or right side 64 and be deflected into receptacle 12.

Abraded material 14 that is created by contact of the fragments with the surface 6 are so small in size that they can pass through openings 7a, 7b, and 7c and are collected by inlet openings 36. If abraded material 14 reaches discharge end 5 along with fragments 10, it is collected by extraction unit 4 at inlet 34 adjacent to end 5 and thus does not fall into receptacle 13 with fragments 10.

The advantages of the method according to the invention and the vibrating conveyor unit according to the invention include the contamination-free conveying, classification, separation and dust removal of the silicon fragments. During this method, surprisingly, the sharp broken edges of the pieces of silicon are rounded and mechanical-physical decontamination takes place.

While a few embodiments of the present invention have been shown and described, it is to be understood that many changes and modifications may be made thereunto without departing from the spirit and scope of the invention as defined in the appended claims.

What is claimed is:

1. A vibrating conveyor comprising
   a first vibrating conveyor unit having a conveyor surface made from hyperpure silicon;
   a second vibrating conveyor unit having a conveyor surface which is made from hyperpure silicon and has passage openings therethrough;
   wherein the second vibrating conveyor unit has a conveying path and a discharge end,
   wherein a width or a diameter of the passage openings of the second vibrating conveyor unit increases in a direction of the discharge end along the conveying path;
   wherein passage openings in the second vibrating conveyor unit are selected from the group consisting of small size openings at a first end of said second vibrating conveyor unit, large size openings at a second end of said second vibrating conveyor unit, and intermediate size openings between said small size openings and said large size openings;
   a transition point on the conveyor surface of the second vibrating conveyor unit between the small size openings and the intermediate size openings; and
   a triangular deflector positioned beneath said transition point.

2. The vibrating conveyor as claimed in claim 1, further comprising
   a dust-removal device located at a discharge end of the first vibrating conveyor unit.

3. A method for separating silicon fragments comprising
   guiding the silicon fragments over a vibrating conveyor, said conveyor being a conveyor surface which is made from hyperpure silicon and said conveyor surface having passage openings therethrough;
   separating smaller fragments from larger fragments by having the smaller fragments fall through said passage openings;
   wherein a width or diameter of the passage openings of the vibrating conveyor increases in a direction of a discharge end of said conveyor along a conveying path of said conveyor;
   wherein the passage openings in the vibrating conveyor are selected from the group consisting of small size openings at a first end of said vibrating conveyor, large size openings at a second end of said vibrating conveyor; and intermediate size openings between said small size openings and said large size openings;
   providing a transition point on the conveyor surface between the small size openings and the intermediate size openings;
   causing smaller size fragments to fall through the small size openings on one side of the transition point; and causing medium size fragments to fall through the intermediate size openings on another side of the transition point;
   positioning a triangular deflector directly beneath said transition point; said triangular deflector having a left side and a right side;
   causing the smaller fragments to fall through the small size openings to contact said left side of said triangular deflector to be deflected into a first receptacle; and
   causing the medium size fragments to fall through the intermediate size openings to contact said right side of said triangular deflector to be deflected into a second receptacle.

* * * * *